Jan. 7, 1964
A. B. SANFORD
3,116,564
TEACHING MACHINE
Filed April 26, 1961
2 Sheets-Sheet 1
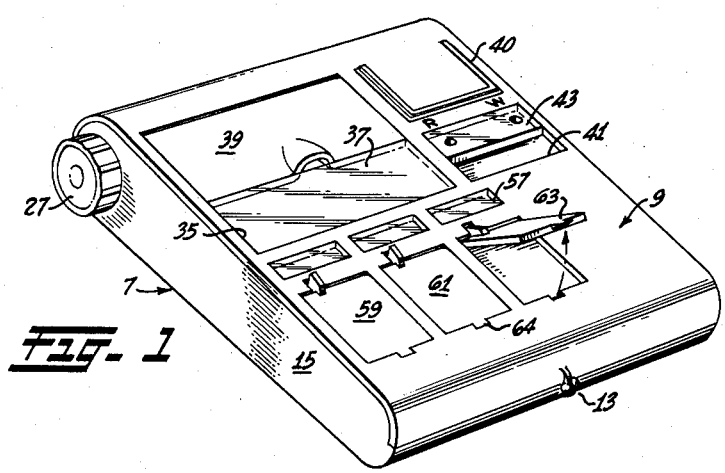
Fig. 1
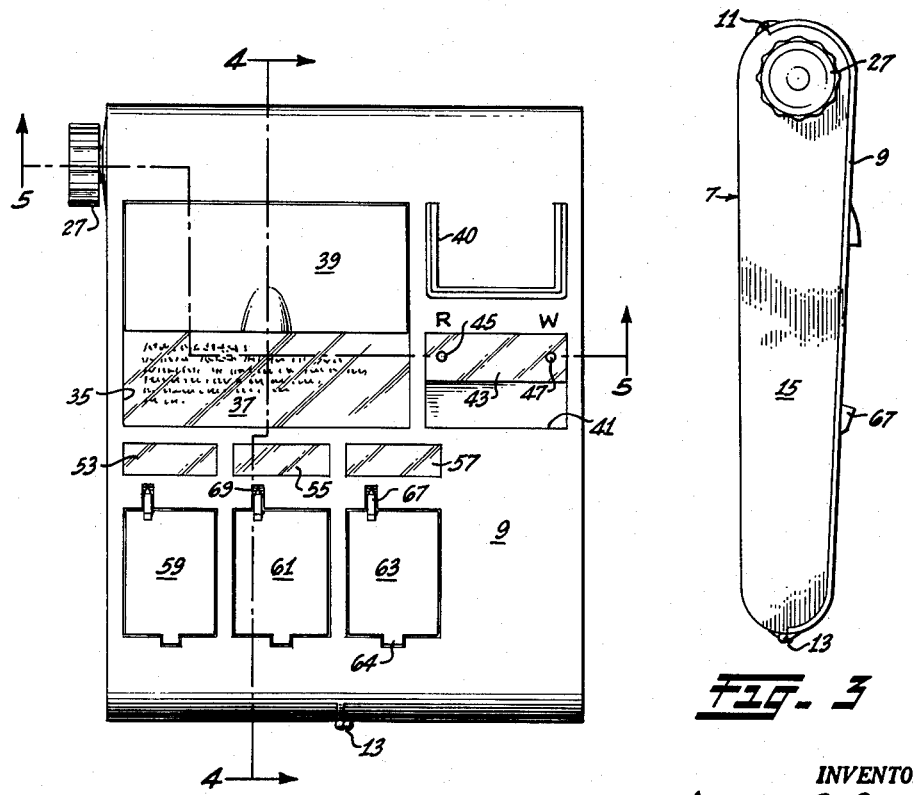
Fig. 2
Fig. 3
INVENTOR:-
ADRIAN B. SANFORD
BY
ATTORNEYS Jan. 7, 1964
A. B. SANFORD
3,116,564
TEACHING MACHINE
Filed April 26, 1961
2 Sheets-Sheet 2
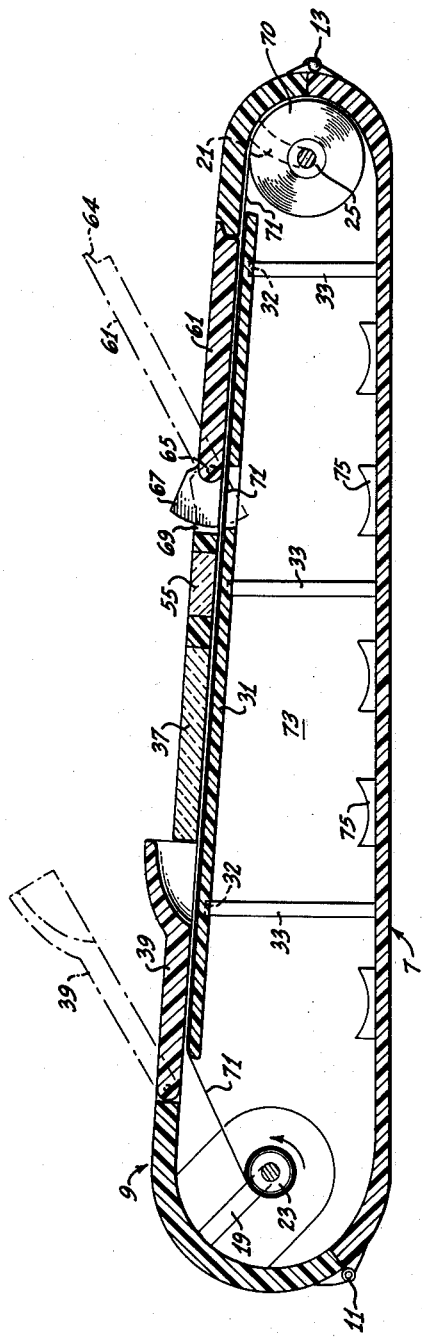
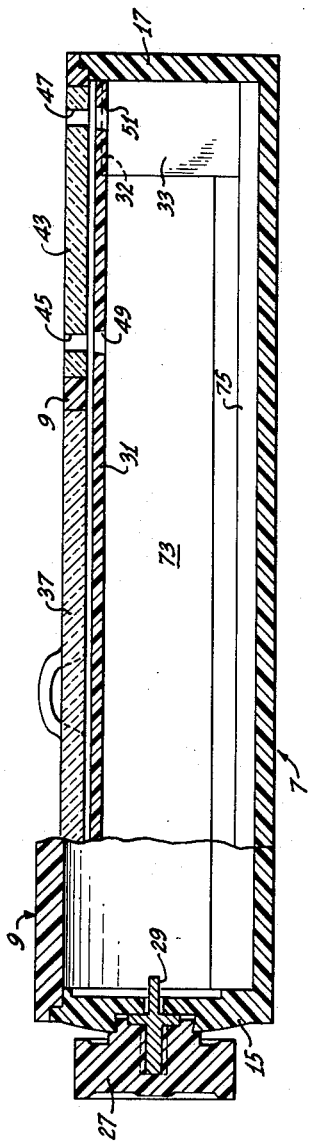
INVENTOR:—
ADRIAN B. SANFORD
BY
ATTORNEYS

United States Patent Office 3,116,564
Patented Jan. 7, 1964

3,116,564
TEACHING MACHINE
Adrian B. Sanford, Portola Valley, Menlo Park, Calif.
(850 Middlefield Road, Palo Alto, Calif.)
Filed Apr. 26, 1961, Ser. No. 105,717
1 Claim. (Cl. 35—9)

This invention relates to a teaching machine and more particularly relates to a simple mechanical teaching machine which can be programmed for more than one type of lesson material.

At the present time, there are two basic types of programs for teaching machines. One type of program is commonly called the Skinner type and requires that the student write in a word or words in response to a question which is presented. Another type commonly called the Pressey type of program gives the student a question followed by a series of answers, commonly three, and the student selects the answer which seems most appropriate. At the present time educators are not in agreement as to which type of programming material is the more effective so it is highly desirable that a teaching machine be adaptable for either type of programming.

It is, therefore, an object of the present invention to provide a teaching machine which can be programmed for material of either the Skinner or the Pressey type or some combination of both.

Another object of this invention is to provide a simple mechanical teaching machine which operates with a minimum of moving parts and which does not require the use of electricity.

Another object of this invention is to provide a teaching machine of a multiple-choice type which can be fed with a paper tape and wherein the tape is perforated by the student so that it is easy to grade.

Another object of this invention is to provide a teaching machine of the multiple-choice type having a series of answer windows which are self-closing.

Other objects will be apparent from the specification which follows.

In the drawings forming part of this application:

FIGURE 1 is a perspective view of a machine embodying the present invention.

FIGURE 2 is a top view of the machine shown in FIGURE 1.

FIGURE 3 is a side view of the machine shown in FIGURE 1.

FIGURE 4 is a sectional view on the line 4—4 of FIGURE 2.

FIGURE 5 is a sectional view on the line 5—5 of FIGURE 2.

Turning now to a description of the device by reference characters, the machine has a lower or base portion 7 and an upper or top portion generally designated 9, the upper and lower portions being hinged as at 11 and being provided with a fastener at 13. The case thus formed is slightly thicker at the forward end than the rear so that the top surface is inclined at a convenient angle for a student to read when the device is placed flat on a desk. Further, as will be later explained in more detail, the rolls of paper tape occupy more space after they have been unwound and used and the tapered shape permits the take-up roll to be larger than the feed roll. The left side wall 15 and the right side wall 17 are supported by the base 7. The side walls are slotted as at 19 and 21 to receive a take-up reel 23 and a feed reel 25 respectively. Additionally, a knob 27 is rotatably mounted in one of the side walls and it has attached thereto an arm 29 for the purpose of engaging and turning the take-up reel 23.

A plate 31 is supported by the pillars 33 just under the top 9 so that a tape 71 of paper or other suitable material can pass freely between the top 9 and the plate 31. The plate 31 has a series of notches 32 which fit over the pillars 33 and the plate merely rests on the notches so that it can be easily raised making the space thereunder readily accessible for storage. In the top of the machine a viewing window 35 is provided which may merely be an opening in the top 9 but which is preferably covered by a transparent sheet 37. The opening 35 is of a sufficient size to accommodate ordinary questions but in order to provide for extra long questions, and particularly questions where an illustration is incorporated, the hinged cover 39 is provided which can be lifted up to increase the effective amount of the opening. Thus, in case the question is of such a nature that the space 35 is not adequate, the space revealed by lifting the cover 39 will give sufficient space for the question.

An open frame 40 may be provided at a convenient location so that a card can be slipped in the frame. This is particularly useful if a drawing, diagram or the like is applicable to several questions.

At one side of the device an opening 41 is provided so that a student can write on the paper tape underlying the opening. Directly above the opening 41 is a translucent window 43 having two small holes 45 and 47 therein large enough to admit the point of a pencil or ballpoint pen. Plate 31 also has holes 49 and 51 directly underlying the holes 45 and 47, respectively.

Below the window 35 is a plurality of transparent windows or openings 53, 55 and 57. Although three such windows have been shown, since it is customary to provide three alternate answers on a multiple-choice question, a larger number might be employed. Directly under the windows 53, 55 and 57 are the doors 59, 61 and 63, each of which may be provided with a lifting tab 64. Each of the doors is hinged as at 65 and is provided with an extending tab 67. An opening 69 in the plate 31 is provided under each of the tabs 67. The purpose of the tabs 67 is two-fold. In the first place as the door is opened, the tab 67 is thrust downward perforating the paper tape 71 which is lying between the upper cover 9 and the plate 31. Further, as the tape 71 is advanced, pressure on the tab 67 will cause the window to close automatically.

In use, cover 9 is raised and a roll of tape 70 is placed in the slot 21 and the paper tape 71 is drawn over the plate 31 and threaded onto the take-up reel 23. The cover 9 is then snapped in place and the tape can be advanced by rotating the knob 27. The student rotates the tape until a question appears in the window 35, opening the window 39 if this is necessary. If the question is of the Skinner type wherein the student is required to write in a word or words, the material is written directly on the tape through the opening 41. The tape is then advanced so that the answer which the student as written now underlies the transparent window 43 so that the answer cannot be erased. As the student's answer appears in the window 43, the correct answer appears in the window 41. The student, using a pencil or stylus, then punctures the tape under the symbol R or W depending upon whether he has given the right or the wrong answer. The tape is then advanced to the next question, and so on. Of course, it is quite simple to grade the tape either manually or by machine by determining the number of perforations in the R column and the number in the W column.

If the question is of the Pressey or multiple-choice type the student will find that in the windows 53, 55 and 57 there are three possible answers to the question which appears above in the opening 35. The student then decides which of the answers is the proper one and then, by pressing a tab 67 or lifting a tab 64 causes one of the covers 59, 61 or 63 to rise whereupon he will find a statement telling him whether the answer which appeared in the window directly above was correct or incorrect and why. As the cover is raised the tape is perforated. If the student selected the correct answer on the first try he would then advance the tape by means of the knob 27 to the next question which would automatically close the window which he had opened. If he gave the incorrect answer the first time he would then select another answer and open the window to see whether it is correct and, if necessary, would open the third window in case his first two answers were wrong. The tape for this type of answer is quite easily graded either manually or by machine by determining whether the student used one, two or three choices in answering the question.

It will be observed that there is a large open space 73 in the center of the machine and this space can be utilized for the storage of a plurality of rolls. In the embodiment illustrated a series of holders 75 is provided on the bottom plate 7 for the storage of extra rolls. Thus the student can carry up to six rolls in the machine at one time, including the one which is threaded on the reels making it convenient for carrying from class to class or carrying home for homework.

Although a preferred embodiment of the machine has been described, it will be obvious to those skilled in the art that many variations can be made in the machine without departing from the spirit of the invention. In some instances, only a single type of programing may be desired for a course of study in which case the machine may be built for only Pressey type or only the Skinner type of question. The exact arrangement of the parts shown need not be used and the position of the Skinner type and Pressey type answer devices can be reversed. It is not necessary to employ the auxiliary window 39 in those instances where all of the questions will be of the same length and the window 35 may be made larger or smaller than illustrated. It is not necessary to employ the transparent windows at 35, 53, 55 and 57 but instead openings in the cover 9 will suffice.

The tapes used with the machine illustrated can be of one type of program or the other, or the two types of programing may be intermingled in any combination.

It is believed obvious from the foregoing that I have provided a simple, reliable teaching machine which is adapted for use with either of the types of programing now commonly in use.

I claim:

A teaching machine adapted for use with a printed tape having questions thereon, at least one of which can be answered by a write-in answer and another of which can be answered by a multiple choice answer, said machine comprising in combination:

(a) a housing having a generally flat top;
(b) means for passing a flexible tape under the top;
(c) a first opening through which a question on the tape can be read;
(d) second, third and fourth openings through which possible multiple choice answers to the question can be read;
(e) fifth, sixth and seventh openings underlying the second, third and fourth openings, respectively, through which a comment on the tape can be read as to whether a selected answer is correct;
(f) liftable covers normally obscuring the fifth, sixth and seventh openings;
(g) an extending tab on each of the liftable covers, said tab perforating the tape as the tab is lifted and said tab causing the cover to close as the tape is advanced;
(h) and an eighth opening, said eighth opening including a transparent cover partially covering the upper portion of the opening, leaving a lower open space through which a write-in answer can be written on the tape, said transparent cover including two openings through which a stylus can be inserted to perforate the tape indicating whether the write-in answer is correct or incorrect, said transparent cover preventing the answer from being changed after the tape has been advanced.

References Cited in the file of this patent

UNITED STATES PATENTS

| | | |
|---|---|---|
| 1,928,565 | Kindig | Sept. 26, 1933 |
| 1,984,726 | Brownlee | Dec. 18, 1934 |
| 2,030,175 | LeFevre | Feb. 11, 1936 |
| 2,142,419 | Strongman | Jan. 3, 1939 |
| 2,687,579 | Davis | Aug. 31, 1954 |
| 2,915,833 | Genest | Dec. 8, 1959 |
| 2,987,828 | Skinner | June 13, 1961 |
| 3,056,215 | Skinner | Oct. 2, 1962 |

OTHER REFERENCES

Skinner, Fortune Magazine, October 1958 (vol. 58, No. 4), p. 195.